(12) United States Patent
Kim

(10) Patent No.: US 11,319,011 B2
(45) Date of Patent: May 3, 2022

(54) APPARATUS OF ADJUSTING SADDLE ANGLE FOR BICYCLE

(71) Applicant: CREVEN CO., LTD., Seoul (KR)

(72) Inventor: Joon Hyuk Kim, Seoul (KR)

(73) Assignee: CREVEN CO., LTD., Seoul (KR)

( * ) Notice: Subject to any disclaimer, the term of this patent is extended or adjusted under 35 U.S.C. 154(b) by 0 days.

(21) Appl. No.: 16/620,796

(22) PCT Filed: Jun. 26, 2019

(86) PCT No.: PCT/KR2019/007717
§ 371 (c)(1),
(2) Date: Dec. 9, 2019

(87) PCT Pub. No.: WO2020/159014
PCT Pub. Date: Aug. 6, 2020

(65) Prior Publication Data
US 2021/0347426 A1 Nov. 11, 2021

(30) Foreign Application Priority Data
Feb. 1, 2019 (KR) .................. 10-2019-0013937

(51) Int. Cl.
*B62J 1/04* (2006.01)
*B62J 1/08* (2006.01)
(52) U.S. Cl.
CPC .. *B62J 1/04* (2013.01); *B62J 1/08* (2013.01)
(58) Field of Classification Search
CPC .................. B62J 1/04; B62J 1/08; B62J 1/02
See application file for complete search history.

(56) References Cited

U.S. PATENT DOCUMENTS

2012/0086246 A1* 4/2012 Belliveau .................. B62J 1/04
297/201

FOREIGN PATENT DOCUMENTS

| DE | 202017004421 U1 * | 9/2017 | ............... B62J 1/08 |
| FR | 1127121 A * | 12/1956 | ............... B62J 1/04 |
| KR | 10-2009-0016461 | 2/2009 | |

(Continued)

OTHER PUBLICATIONS

International Search Report for International Application No. PCT/KR2019/007717, dated Oct. 30, 2019.
(Continued)

*Primary Examiner* — Milton Nelson, Jr.
(74) *Attorney, Agent, or Firm* — Kile Park Reed & Houtteman PLLC

(57) ABSTRACT

An apparatus adjusting saddle angle for bicycle includes an elastic member forward a central axis in a longitudinal direction of a seat post, a lower body coupled to the seat post and protruding forward to support the elastic member, and an upper body including a saddle coupling portion to the saddle, supporting upper end of the elastic member on upper portion, and hinge-coupled to the lower body to rotate in rotation axis such that the saddle angle is changed for the lower body fixed to the seat post by external force. The elastic member and the rotation axis are in front and rear of the centerline of the lower body, respectively. The saddle coupling portion is in front of the centerline of the lower body and rear of the elastic member, and above the rotation axis. Thus, saddle angle is easily adjusted to improve user's convenience and riding comfort.

5 Claims, 2 Drawing Sheets

(56) References Cited

FOREIGN PATENT DOCUMENTS

| KR | 10-0954490      |   | 4/2010  |
|----|-----------------|---|---------|
| KR | 20110015073 A   | * | 2/2011  |
| KR | 20110030915 A   | * | 3/2011  |
| KR | 10-1599638      |   | 3/2016  |
| KR | 10-1912419      |   | 10/2018 |

OTHER PUBLICATIONS

Written Opinion, with English translation, for International Application No. PCT/KR2019/007717, dated Oct. 30, 2019.
The International Search Report corresponding to International Application No. PCT/KR2019/007717 dated Oct. 30, 2019.

* cited by examiner

APPARATUS OF ADJUSTING SADDLE ANGLE FOR BICYCLE

TECHNICAL FIELD

The present invention relates to an apparatus of adjusting a saddle angle for a bicycle. More particularly, the present invention relates to an apparatus of adjusting a saddle angle for a bicycle capable of adjusting an angle of a saddle for a bicycle.

BACKGROUND ART

In general, bicycles are widely used as means of transportation, which is a kind of two-wheeled vehicle. In particular, in recent years, in addition to transportation, it is used as an exercise equipment and recreational means, and has an advantage of being environmentally friendly.

Such a bicycle typically has a front wheel and a rear wheel that rotate in contact with the ground, a handle that rotatably supports the front wheel and the rear wheel and performs steering of the front wheel, a frame body coupled with the handle, a pedal connected to the rear wheel via a chain to rotate the rear wheel, and a saddle coupled to the frame body to allow a user to ride.

In the conventional bicycle, since the saddle is fixed to the frame, it is difficult to adjust an angle of the saddle according to the user's body shape and driving posture, and therefore, when a user rides on a bicycle at an inclined place, there is a problem that the user's posture is inconvenient due to the fixed saddle and the risk of accident may increase.

DISCLOSURE

Technical Problem

Accordingly, the present invention provides an apparatus of adjusting a saddle angle for a bicycle capable of improving user's convenience by adjusting an angle of a saddle for a bicycle as to solving a technical problem.

Technical Solution

According to an exemplary embodiment of the present invention, an apparatus of adjusting a saddle angle for a bicycle is inserted between a seat post formed in a body of a bicycle and a saddle, and coupled to the seat post and the saddle. The apparatus is provided to adjust an angle of the saddle.

The apparatus includes an elastic member, a lower body and an upper body.

The elastic member is positioned forward with respect to a central axis corresponding to a longitudinal direction in which the seat post extends. The lower body is fixedly coupled to the seat post and protruding forward to support a lower end of the elastic member. The upper body includes a saddle coupling portion fixedly coupled to the saddle. The upper body is positioned at least on an upper portion of the elastic member to support an upper end of the elastic member, and hinge-coupled to the lower body to rotate with respect to a rotation axis such that the saddle angle is changed with respect to the lower body to be relatively fixed to the seat post by an external force. The elastic member is located in front of a center line of the lower body. The rotation axis is located in rear of the center line of the lower body. The saddle coupling portion is located in front of the center line of the lower body and in rear of the elastic member, and located above the rotation axis.

In an exemplary embodiment, the elastic member may be exposed, or covered with a transparent member, so as to be externally distinguishable by a naked eye.

In an exemplary embodiment, the elastic member may be replaceable by a user according to weight of a user among a plurality of springs having different colors depending on the elastic modulus.

In an exemplary embodiment, the lower body may include a lower body portion, a lower end support portion and a lower coupling portion. The lower body portion is fixedly coupled to the seat post and extending in a direction of the central axis. The lower end support portion extends forward from the lower body portion to support a lower end of the elastic member. The lower coupling portion extends rearward from the lower body portion and coupled to the upper body.

In an exemplary embodiment, the upper body may further include an upper body portion, a fixing cap and an upper coupling portion. The fixing cap is disposed at a front side of the upper body portion to correspond to the elastic member and fixing the elastic member to the upper body portion with covering an upper end of the elastic member. The fixing cap is openable to replace the elastic member. The upper coupling portion is hinge-coupled to the lower body at the rear side of the upper body portion. The saddle coupling portion is disposed at both sides of the upper body portion, to fix the saddle.

Advantageous Effects

According to the present invention, since the elastic member is deformed in the deformation direction according to the movement of the user's center of gravity to maintain the equilibrium in the state where the saddle angle is changed, the saddle angle is downwardly increased by a predetermined amount, only by the user leaning forward to balance the uphill or downhill. Thus, the user may easily adjust the saddle angle. In addition, even if not an uphill or a downhill, when the center of gravity of the user moves according to the characteristics of the ground, the saddle angle is changed in real time to maintain the balance, to greatly improve the user's convenience and riding comfort.

In addition, the elastic member is interposed between the lower body supporting the lower end of the elastic member and the upper body supporting the upper end of the elastic member. The lower body is fixed to the bicycle body, and the upper body is fixed to the saddle and configured to rotate relative to the lower body, to thereby effectively form a configuration for adjusting the saddle angle.

In addition, the elastic member is located in front of the center line of the lower body, and the rotation axis is located in rear of the center line of the lower body. The saddle coupling portion is located in front of the center line of the lower body and in rear of the elastic member, and formed so as to be located above the rotation axis, to thereby allow the saddle angle adjustment to be stable and effective.

In addition, when the elastic member may be externally distinguishable, the rigidity of the elastic member may be easily understood. When the elastic member is selected and replaceable according to the weight of the user from among a plurality of springs having different colors depending on the elastic modulus, the saddle angle may be adjusted with more various angles, and even if several users have different body shapes, each user may change the saddle angle into an optimized angle for the user.

In addition, in the case of installing a fixed cap for replacement, the replacement of the elastic member may be very easy.

MODE FOR INVENTION

Figure 1:
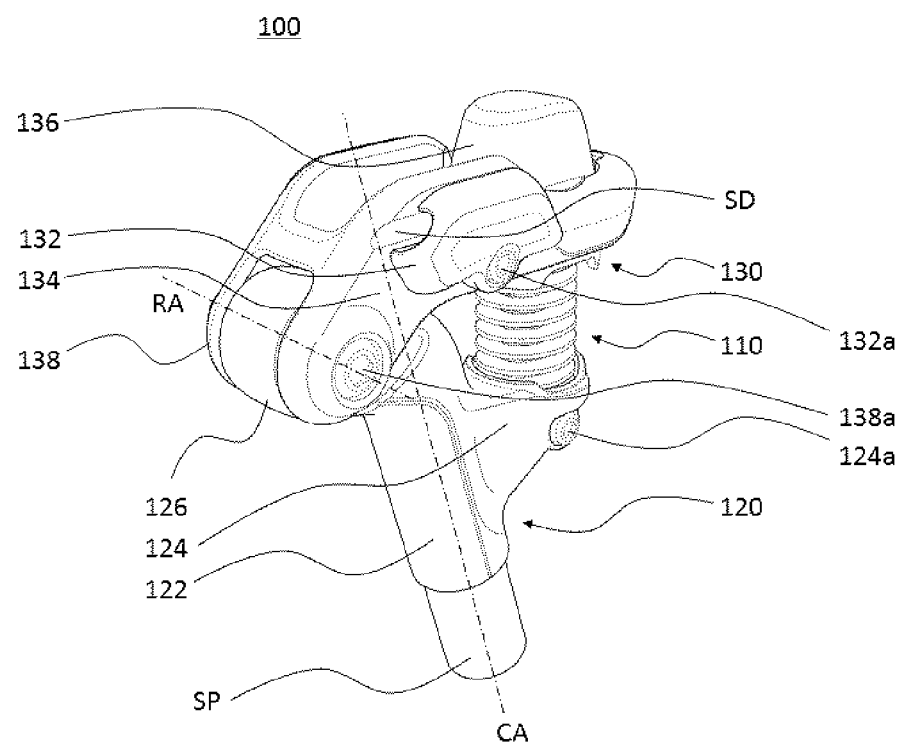
FIG. 1 is a perspective view illustrating an apparatus of adjusting a saddle angle for a bicycle according to an exemplary embodiment of the present invention.

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that, although the terms first, second, etc. may be used herein to describe various elements, these elements should not be limited by these terms. These terms are only used to distinguish one element from another element. For example, a first element discussed below could be termed a second element, and similarly, a second element may also be termed a first element, without departing from the teachings of the present invention.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, components, and/or groups thereof but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings.

Figure 2:
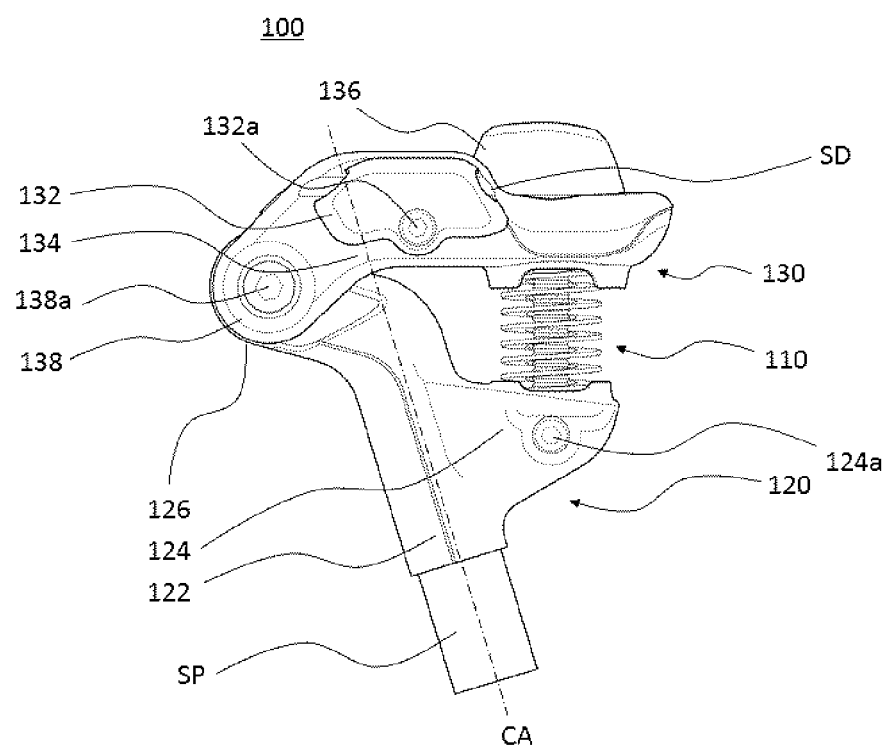
FIG. 2 is a side view of an apparatus of adjusting a saddle angle for a bicycle in FIG. 2.

FIG. 1 is a perspective view illustrating an apparatus of adjusting a saddle angle for a bicycle according to an exemplary embodiment of the present invention. FIG. 2 is a side view of an apparatus of adjusting a saddle angle for a bicycle in FIG. 2.

Referring to FIGS. 1 and 2, an apparatus 100 of adjusting a saddle angle for a bicycle according to an exemplary embodiment of the present invention is inserted between a seat post SP formed in a body of a bicycle and a saddle SD, and coupled to the seat post SP and the saddle SD. The apparatus 100 is provided to adjust an angle of the saddle SD.

The saddle SD shown in the drawings shows only a part of a saddle bar, and will be described in detail later.

The apparatus 100 of adjusting a saddle angle for a bicycle according to an exemplary embodiment of the present invention includes an elastic member 110, a lower body 120 and an upper body 130.

The elastic member 110 is located forward with respect to a central axis CA corresponding to a longitudinal direction in which the seat post SP extends.

The elastic member 110 is deformed and restored in a predetermined deformation direction by the application and removal of an external force. That is, the elastic member 110 may include an elastic body having a predetermined elastic modulus and may be deformed according to an external force. In FIGS. 1 and 2, the elastic member 110 shows a coil spring as an example, but may be replaced with another configuration having an elastic modulus. For example, other forms of springs such as leaf springs, or elastomers made of polymer compounds such as rubber may be available.

The lower body 120 is fixedly coupled to the seat post SP and protrudes forward to support a lower end of the elastic member 110.

In an embodiment, the lower body 120 may include a lower body portion 122, a lower end support portion 124, and a lower coupling portion 126.

The lower body portion 122 is fixedly coupled to the seat post SP and extends in the direction of the central axis CA. The lower body portion 122 is coupled to the seat post SP corresponding to the body of the bicycle. In general, the seat post SP is directly coupled to the saddle SD. However, the apparatus 100 of adjusting a saddle angle for a bicycle according to an embodiment of the present invention is disposed between the seat post SP and the saddle SD, and is coupled to the seat post SP and the saddle SD. In this case, the lower body portion 122 may be coupled to the seat post SP in various ways, such as screw coupling.

The lower end support portion 124 extends forward from the lower body portion 122 to support the lower end of the elastic member 110. For example, as shown in FIG. 1, the lower end support portion 124 may support the lower end of the elastic member 110 by fixedly coupling the lower end of the elastic member 110 to the lower body 120 by using a coupling member 124a such as a bolt.

The lower coupling portion 126 extends rearward from the lower body portion 122 to be coupled to the upper body 130. The coupling method will be described later.

The upper body 130 includes a saddle coupling portion 132 that is fixedly coupled to the saddle SD.

For example, the saddle SD may have a well-known configuration, and may include a seat and two saddle bars fixedly installed under the seat and having a guide rail shape. In FIGS. 1 and 2, one saddle bar formed at one side of the upper body 130 is illustrated.

In one embodiment, the saddle coupling portion 132 may have a housing shape that is open forward and rearward to allow the saddle bar to pass therethrough, and may receive and fix a portion of the saddle bar. For example, as shown in FIG. 1, the saddle coupling portion 132 may be fixedly coupled to the body of the upper body 130 by using a coupling member 132a such as a bolt.

The upper body 130 is located at least on the elastic member 110 to support an upper end of the elastic member 110, and hinge-coupled to the lower body 120 to rotate with respect to a rotation axis RA such that the saddle angle is changed with respect to the lower body 120 to be relatively fixed to the seat post SP by an external force.

In a specific embodiment, the upper body 130 may further include an upper body portion 134, a fixing cap 136, and an upper coupling portion 138.

The upper body portion 134 may have a shape extending forward and backward with respect to the central axis CA. The saddle coupling portion 132 may be disposed at both sides of the upper body portion 134 to fix the saddle SD. Regarding the saddle SD, as described above, only a portion of the saddle bar is shown. However, the saddle bar is further extended in the longitudinal direction and fixedly coupled to the seat positioned thereon, and thus the saddle SD including the seat may be maintained in a state of being fixed to the upper body 130.

The fixing cap 136 is disposed at the front side of the upper body portion 134 to correspond to the elastic member 110 and fixing the elastic member 110 to the upper body portion 134 with covering the upper end of the elastic member 110. The fixing cap 136 is openable to replace the elastic member 110.

For example, the upper body portion 134 may have a hole formed in the front side corresponding to the fixing cap 136 and the elastic member 110, and a thread may be formed in the hole. In addition, a screw thread corresponding to the hole may be formed in the fixing cap 136, and the fixing cap 136 may be screwed into the hole of the upper body portion 134 while pressing the upper end of the elastic member 110. Accordingly, since the user may rotate and detach the fixing cap 136, the elastic member 110 may be easily replaced with an elastic member suitable for user's weight.

The upper coupling portion 138 is hinge-coupled to the lower body 120 at the rear side of the upper body portion 134. For example, the upper coupling portion 138 and the lower coupling portion 126 may be rotatably coupled using a coupling member 138a such as a bolt, as shown in FIG. 1.

By the coupling configuration as described above, the upper body 130 integrally fixed with the saddle SD may be rotated relative to the lower body 120 integrally fixed with the bicycle body including the seat post SP. Thus, as an external force such as weight of a rider is applied to the saddle SD, the elastic member 110 is deformed and restored in the deformation direction, whereby the saddle SD may be rotatable vertically up and down about the rotation axis RA by a predetermined angle, and the saddle angle of the saddle SD may be adjusted.

The elastic modulus of the elastic member 110 may be provided according to the weight of the rider. That is, when the weight of the rider is large, the elastic member having a high elastic modulus may be provided, and when the weight of the rider is small, the elastic member having a low elastic modulus may be provided. Thus, as the weight of the rider is large or small, the deformation amount may not be significantly changed depending on the weight, and the elastic modulus may be adjusted so that the saddle angle may be changed within a maximum of about 15 degrees regardless of the weight of the rider.

To this end, the elastic member 110 may be installed to be replaced so as to use an elastic member having a different elastic modulus. In addition, the elastic member 110 may be provided so that the rider easily grasps an elastic member having an elastic modulus suitable to the rider himself or herself.

In one embodiment, the elastic member 110 may be exposed, or covered with a transparent member, so as to be externally distinguishable by a naked eye. In addition, in one embodiment, the elastic member 110 may be selected and replaced according to the weight of the user from among a plurality of springs having different colors depending on the elastic modulus. For example, a yellow spring for the weight of 40 kg to 50 kg, an orange spring for a weight of 45 kg to 55 kg, a red spring for a weight of 50 kg to 60 kg, a purple spring for a weight of 55 kg to 65 kg, a blue spring for a weight of 60 kg to 70 kg, a navy blue spring for a weight of 65 kg to 75 kg, and a black spring for a weight of 70 kg to 80 kg may be provided.

In this way, the elastic member 110 may be provided with a plurality of springs having different colors according to the elastic modulus. Thus, the user may determine the type of the elastic member by the color thereof so that the user easily grasp and replace the elastic member to be suitable for the user's weight, and even when only one bicycle is used by several people, an appropriate elastic member may be selected.

By using the elastic member 110, when the user moves user's upper body to move the center of gravity forward in the uphill or downhill, the balance of force is accomplished at a specific saddle angle by the degree of movement of the center of gravity forward. Accordingly, the elastic member 110 fixedly coupled to the saddle SD is kept deformed downward. Thus, the saddle angle may be changed. In particular, as the degree of ascent increases, in particular, the user moves the center of gravity to a greater front, and the external force acting on the elastic member 110 becomes greater, so that the deformation of the elastic member 110 is further increased to change the saddle angle more greatly. In the flat ground again, the user returns the center of gravity to normal and the elastic member 110 is restored so that the saddle angle may be zero.

In order to effectively implement such a mechanism, the elastic member 110 is located in front of the center line of the lower body 120, and the rotation axis RA is located in rear of the center line of the lower body 120. In addition, the saddle coupling portion 132 is located in front of the center line of the lower body 120 and in rear of the elastic member 110, and located above the rotation axis RA.

Specifically, in order to effectively implement such a mechanism, it may be desirable to meet the above conditions, which will be explained in detail below.

First, the position of the user's center of gravity on a flat place corresponds to the center axis CA of the seat post, so that the rotation axis RA, which is a criterion for determining the saddle angle, should be located behind the center axis CA. Accordingly, the deformation amount of the elastic member 110 is zero and the saddle angle is zero at a flat place.

Second, the position of the user's center of gravity on an inclined place is located in front of the center axis CA of the seat post, and the greater the degree of inclination, the more the center of gravity moves forward, so that the elastic member 110, which is a criterion for determining the degree of the saddle angle, should be in front of the central axis CA. Accordingly, the amount of deformation of the elastic member 110 is generated in an inclined place, the saddle angle may increase as the inclination is steep.

Third, the weight of the user applied to the saddle is more concentrated on the saddle coupling portion 132, so that the saddle coupling portion 132 should be located more forward than the central axis CA in order to more smoothly rotate the upper body 130, for example, the position of the coupling member 132a, which is a position where the saddle coupling portion 132 is coupled, is located in front of the central axis CA, and should be located nearer at the central axis CA rather than the elastic member 110. In addition, the saddle coupling portion 132 should be located above the rotational axis CA for stable fixing and rotation.

Therefore, in the present embodiment, the elastic member 110 is located in front of the center line of the lower body 120, the rotational axis RA is located in rear of the center line of the lower body 120. The saddle coupling portion 132 is located in front of the center line of the lower body 120 and in rear of the elastic member 110, and saddle coupling portion 132 is located above the rotation axis RA.

According to the above apparatus of adjusting a saddle angle for a bicycle, since the elastic member is deformed in the deformation direction according to the movement of the user's center of gravity to maintain the equilibrium in the state where the saddle angle is changed, the saddle angle is downwardly increased by a predetermined amount, only by the user leaning forward to balance the uphill or downhill. Thus, the user may easily adjust the saddle angle. In addition, even if not an uphill or a downhill, when the center of gravity of the user moves according to the characteristics of the ground, the saddle angle is changed in real time to maintain the balance, to greatly improve the user's convenience and riding comfort.

In addition, the elastic member is interposed between the lower body supporting the lower end of the elastic member and the upper body supporting the upper end of the elastic member. The lower body is fixed to the bicycle body, and the upper body is fixed to the saddle and configured to rotate relative to the lower body, to thereby effectively form a configuration for adjusting the saddle angle.

In addition, the elastic member is located in front of the center line of the lower body, and the rotation axis is located in rear of the center line of the lower body. The saddle coupling portion is located in front of the center line of the lower body and in rear of the elastic member, and formed so as to be located above the rotation axis, to thereby allow the saddle angle adjustment to be stable and effective.

In addition, when the elastic member may be externally distinguishable, the rigidity of the elastic member may be easily understood. When the elastic member is selected and replaceable according to the weight of the user from among a plurality of springs having different colors depending on the elastic modulus, the saddle angle may be adjusted with more various angles, and even if several users have different body shapes, each user may change the saddle angle into an optimized angle for the user.

In addition, in the case of installing a fixed cap for replacement, the replacement of the elastic member may be very easy.

It will be apparent to those skilled in the art that various modifications and variations may be made in the present invention without departing from the spirit or scope of the invention. Thus, it is intended that the present invention cover the modifications and variations of this invention provided they come within the scope of the appended claims and their equivalents.

The invention claimed is:

1. An apparatus of adjusting a saddle angle for a bicycle, inserted between a seat post formed in a body of a bicycle and a saddle, and coupled to the seat post and the saddle, to adjust an angle of the saddle, the apparatus comprising:
    an elastic member positioned forward with respect to a central axis corresponding to a longitudinal direction in which the seat post extends;
    a lower body fixedly coupled to the seat post and protruding forward to support a lower end of the elastic member; and
    an upper body including a saddle coupling portion fixedly coupled to the saddle, the upper body being positioned at least on an upper portion of the elastic member to support an upper end of the elastic member, and hinge-coupled to the lower body to rotate with respect to a rotation axis such that the saddle angle is changed with respect to the lower body to be relatively fixed to the seat post by an external force;
    wherein the elastic member is located in front of a center line of the lower body,
    the rotation axis is located in rear of the center line of the lower body, and
    the saddle coupling portion is located in front of the center line of the lower body and in rear of the elastic member, and located above the rotation axis.

2. The apparatus of claim 1, wherein the elastic member is externally distinguishable by a naked eye.

3. The apparatus of claim 1, wherein the elastic member is replaceable by a user according to weight of a user among a plurality of springs having different colors depending on the elastic modulus.

4. The apparatus of claim 1, wherein the lower body includes:
    a lower body portion fixedly coupled to the seat post and extending in a direction of the central axis;
    a lower end support portion extending forward from the lower body portion to support a lower end of the elastic member; and
    a lower coupling portion extending rearward from the lower body portion and coupled to the upper body.

5. The apparatus of claim 1, wherein the upper body further includes:
    an upper body portion;
    a fixing cap disposed at a front side of the upper body portion to correspond to the elastic member and fixing the elastic member to the upper body portion with covering an upper end of the elastic member, the fixing cap being openable to replace the elastic member; and
    an upper coupling portion hinge-coupled to the lower body at the rear side of the upper body portion,
    wherein the saddle coupling portion is disposed at both sides of the upper body portion, to fix the saddle.

* * * * *